United States Patent [19]

Wagener et al.

[11] 4,235,604
[45] Nov. 25, 1980

[54] METHOD FOR PROCESSING COKE OVEN GAS

[75] Inventors: Dietrich Wagener; Claus Flockenhaus, both of Essen; Joachim F. Meckel, Heiligenhaus, all of Fed. Rep. of Germany

[73] Assignee: Didier Engineering GmbH, Essen, Fed. Rep. of Germany

[21] Appl. No.: 865,725

[22] Filed: Dec. 29, 1977

[30] Foreign Application Priority Data

Dec. 31, 1976 [DE] Fed. Rep. of Germany ....... 2659782

[51] Int. Cl.$^3$ ............................ C10K 1/34; C01B 3/38
[52] U.S. Cl. .................................. 48/197 R; 201/41; 252/373
[58] Field of Search ................. 48/197 R, 213, 214 A; 252/373; 75/34, 35, 91; 201/4, 41

[56] References Cited

U.S. PATENT DOCUMENTS

| | | | |
|---|---|---|---|
| 2,547,685 | 4/1951 | Brassert et al. ........................... | 75/34 |
| 2,740,706 | 4/1956 | Paull et al. ................................ | 75/35 |
| 2,924,556 | 2/1960 | Jaeppelt et al. ........................... | 201/4 |
| 2,928,730 | 3/1960 | Luerssen ................................... | 75/34 |
| 3,136,624 | 6/1964 | Mader et al. .............................. | 75/34 |
| 3,475,160 | 10/1969 | Heinzelmann et al. ................. | 48/213 |
| 3,849,087 | 11/1974 | Arakawa et al. ....................... | 48/213 |
| 3,909,446 | 9/1975 | Miyashita et al. .................... | 252/373 |
| 3,957,681 | 5/1976 | Tomita et al. ......................... | 252/373 |
| 4,046,557 | 9/1977 | Beggs ....................................... | 75/35 |
| 4,076,612 | 2/1978 | Hollaway ........................... | 48/197 R |

FOREIGN PATENT DOCUMENTS 1433469 10/1970 Fed. Rep. of Germany ........ 48/197 R
2232650 1/1973 Fed. Rep. of Germany .......... 252/373

*Primary Examiner*—Peter F. Kratz
*Attorney, Agent, or Firm*—Wenderoth, Lind & Ponack

[57] ABSTRACT

Coke oven gas is subjected, immediately after the discharge thereof from coke ovens, and without any preliminary cooling operation or any purification operation other than desulfurization, to a catalytic cracking operation to form a hot cracked gas which is rich in hydrogen and carbon monoxide. The catalytic cracking reaction is carried out in the presence of a hydrogen-containing and/or $CO_2$-containing gas, with a steam reforming catalyst.

12 Claims, 1 Drawing Figure

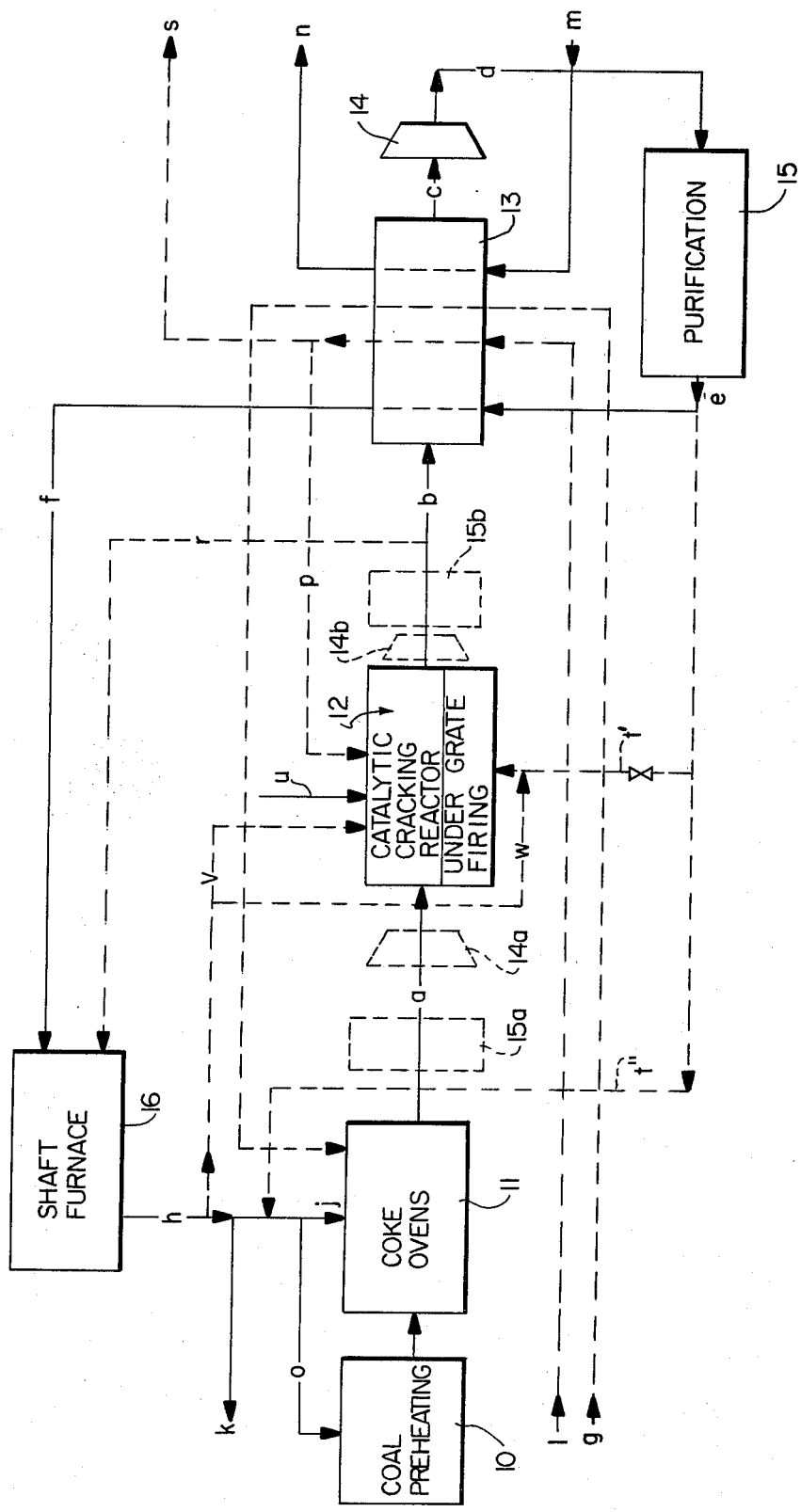

METHOD FOR PROCESSING COKE OVEN GAS

BACKGROUND OF THE INVENTION

The present invention relates to a process for processing, treating and utilizing coke oven gas.

It is known that coke ovens, used to form coke, discharge gases which have a relatively high temperature and which contain a great many impurities. For environmental reasons it is not possible to discharge such coke oven gases directly to the atmosphere. It has accordingly been a common practice to cool coke oven gases by subjecting the coke oven gases to a condensation operation. Both the gaseous and liquid components resulting from such a condensation operation are further treated in a secondary recovery installation to remove the impurities therefrom, and particularly to separate tar, ammonia, sulfur, benzene and naphthalene. It is also known to use the thus purified coke oven gas for the under-grate firing of the coke ovens. It is additionally known, when the coke ovens are part of an overall installation of a steel mill or other metallurgical plant which includes at least one shaft furnace, for example a blast furnace, that the waste gas from the blast furnaces may be used for the under-grate firing of the coke ovens.

However, in recent years the market for the products recovered from the secondary recovery treatment of the coke oven gases has fallen. Accordingly, the secondary recovery treatment operation has become uneconomical, and such secondary recovery treatment operation is generally now performed only to purify the coke oven gas. In fact, the products of the secondary recovery treatment operation are conventionally at least partially destroyed, as exemplified by the now common practice of combustion of the ammonia recovered from the secondary recovery treatment operation of the coke oven gas.

Accordingly, the sensible heat of the coke oven gas is to a very large degree wasted in conventional installations. It of course would be of great practical advantage to be able to utilize the sensible heat of the coke oven gas in other heat consuming operations. Coke oven gas generally has a temperature of approximately 700° to 750° C. upon discharge from the coke ovens. If it would be possible to use this heat, then not only would the cost of the secondary recovery treatment operation be saved, but also potential damage to the environment would be reduced, since the coke oven gases would not be discharged to the atmosphere.

In German DT-OS No. 22 32 650, there is disclosed a process for preparing a reducing gas by heating an exhaust gas from the upper side of a reducing furnace, for example a blast furnace, with a methane-containing gas, for example coke oven gas, natural gas, or the like. Specifically, there is introduced into a reforming furnace a mixture of methane or methane-containing hydrocarbon gas, for example a cooled and purified coke oven gas, which was subsequently heated to a temperature below 1000° C., and a gas which contains $CO_2$, $H_2O$, etc., for example the exhaust gas from a blast furnace, and which was heated to a temperature of more than 1250° C. The resultant mixture is reformed into a reducing gas by heating the mixture in the reforming furnace to a temperature higher than 1200° C. There is thus obtained a gas mixture having a relatively high inert fraction, particularly nitrogen.

Additionally, German Patent Application No. P 26 38 348.2, corresponding to U.S. application Ser. No. 827,809, filed Aug. 25, 1977, provides a method for further processing coke oven gas.

All of these and other known methods for processing and utilization of coke oven gas, however, are not entirely ideal.

SUMMARY OF THE INVENTION

With the above discussion in mind, it is a primary object of the present invention to provide a method for the processing, treatment and utilization of coke oven gas, wherein the coke oven gas is processed in an economical manner and wherein the sensible heat of the coke oven gas is itself utilized, with the result that the previously necessary and expensive purification of coke oven gas can substantially be eliminated.

This object is achieved in accordance with the present invention in that the coke oven gas is subjected, immediately after the discharge thereof from coke ovens, and without any preliminary cooling operation or any substantial purification operation, to a catalytic cracking operation to transform the coke oven gas into a cracked gas which is rich in carbon monoxide and hydrogen.

In accordance with the present invention the catalytic cracking operation is carried out in the presence of a hydrogen-containing and/or a $CO_2$-containing gas, under the indirect supply of heat due to the endothermic nature of the cracking reaction, and employing a suitable known catalyst of the steam reforming type.

In accordance with the present invention the catalytic cracking operation is carried out in the presence of steam and/or a $CO_2$-containing gas. A particularly useful gas for this purpose is the waste gas which is conventionally discharged from an iron ore reduction furnace, for example a blast furnace. It is to be understood however that various other hydrogen-containing and/or $CO_2$-containing gases may be employed in the method of the present invention. It is believed that one of ordinary skill in the art would readily understand the types of available gases which may be employed in this method, keeping in mind that the desired result is that the coke oven gas be transformed into a cracked gas which is rich in carbon monoxide and hydrogen.

It is furthermore believed that those of ordinary skill in the art will readily understand the types of catalysts which may be employed in the present invention. Specifically, customary steam reforming catalysts, preferably substantially $SiO_2$-free, $Al_2O_3$-and alkaline earth metal oxide-containing catalysts, may be employed. Specific examples of such conventional steam reforming catalysts are disclosed in "A New Steam Reforming Process of Heavy Hydrocarbons", by T. Tomita and M. Kitagawa, lecture for "European Meeting of Chemical Engineering", June 23, 1976, ACHEMA, 1976, Frankfort on Main, and in "Erdöl und Kohle, Erdgas, Petrochemie (Petroleum and Coal, Natural Gas, Petrochemistry)", No. 9, (September 1976).

Specific examples of compositions of catalysts which may be used in accordance with the present invention are (A) 63% by weight $Al_2O_3$, 31% by weight SrO, and 6% by weight BeO; (B) 70% by weight $Al_2O_3$, and 30% by weight BeO; and (C) 45% by weight $Al_2O_3$, 45% by weight CaO, and 10% by weight SrO. Any combination of the above three catalysts may be employed. It is however specifically to be understood that these three catalysts are listed as being exemplary only. The present invention is not limited in scope to these specific catalysts. Rather, the present invention is intended to cover all catalysts of the type described above and which, as will be apparent to those skilled in the art, operate in the presence of a hydrogen-containing and/or $CO_2$-containing gas, particularly steam and/or a $CO_2$-containing gas, to transform coke oven gas into a cracked gas which is rich in carbon monoxide and hydrogen.

Accordingly, in accordance with the method of the present invention, the sensible heat of the coke oven gas is used in carrying out the catalytic cracking operation. The impurities of the coke oven gas are substantially removed during the cracking operation, thereby eliminating the need for the heretofore necessary secondary recovery treatment operation, thereby reducing both capital and operating costs.

In accordance with the present invention, the catalytic cracking reaction produces a cracked gas in the form of a synthesis gas, a fuel gas or a reduction gas having a very high degree of reduction capability. The reduction capabilities of a thus produced reduction gas are increased when the coke oven gas used is gas formed during the coking of preheated coal. Preheating of the coal is of particular advantage when the catalytic cracking of the coke oven gas is carried out in the presence of a $CO_2$-rich gas as a medium of reaction to form a reduction gas.

The method of the present invention becomes even more economical when the heat of the hot cracked gas is employed to preheat or produce the media of reaction. Specifically, in accordance with the present invention water may be placed in heat exchange relationship with a hot cracked gas to thereby form steam which is employed as a medium of reaction in the catalytic cracking operation. Also, a $CO_2$-containing gas may be preheated by passing it in heat exchange relationship with the hot cracked gas. Additionally, the heat of the hot cracked gas may be used to preheat a fuel gas which is used in the coke ovens and/or a fuel gas which may be supplied to other components of an overall metallurgical installation of which the coke ovens are a part.

Due to the fact that it is possible in accordance with the method of the present invention to produce a hot cracked gas which has a high degree of reduction capabilities, the hot cracked gas may be supplied to a reduction furnace, for example a shaft furnace such as a blast furnace, for the direct reduction of an ore, such as iron ore. See for example "Stahl und Eisen (Steel and Iron)", 82, No. 13 (1962), pages 869–883.

When a reduction gas is formed from the catalytic cracking operation, and when the thus formed reduction gas is passed to a shaft furnace, the shaft furnace will exhaust a $CO_2$-rich waste gas which can be used as the medium of reaction in the catalytic reactor and/or for the under-grate firing of the catalytic reactor.

In accordance with a preferred embodiment of the present invention, the hot cracked gas is cooled by means of a cooling agent, and the thus cooled cracked gas is compressed and subjected to a final purification operation, for example a desulfurization operation. The thus cooled and purified cracked gas may then be employed in a particular desired manner, for example as a reduction gas in a shaft furnace, as a synthesis gas, or as a fuel gas. The cooling of the cracked gas is particularly desirable when the catalytic cracking operation is in accordance with a steam reforming process as discussed in Tomita Kitagawa, supra, and wherein the steam remaining in the cracked gas should be condensed out, to attain a particularly required degree of oxidation or reduction when the cracked gas is to be used as a reduction gas.

As indicated above, the coke oven gas is immediately subjected to a catalytic cracking operation, immediately after the discharge of the coke oven gas from the coke ovens. This catalytic cracking operation is carried out without any preliminary purification operation. One possible exception to this exclusion is however when the catalyst is of a type which will not bear or stand up to the amount of sulfur contained in the coke oven gas. Under such a circumstance, the coke oven gas may be subjected to a desulfurization operation prior to catalytic cracking. It is believed that one of ordinary skill in the art will understand the circumstances under which particular catalysts would be rendered ineffective by particular sulfur contents of the coke oven gas.

When the cracked gas is cooled and subjected to a final purification operation, it may be preheated by passing it in heat exchange relationship with the hot cracked gas received from the catalytic reactor. The thus heated cracked gas may then be passed to a suitable source of utilization as a reduction gas, as a synthesis gas, or as a fuel gas.

The hot cracked gas may be passed as a reduction gas to a shaft furnace without first cooling the cracked gas, and in such an instance it is desirable that the gas be compressed, either before cracking or after cracking and before transfer to the shaft furnace.

When the process of the present invention is employed as an integral part of an overall metallurgical processing system including both coke ovens and shaft furnaces, the waste gas discharged from the shaft furnaces may be entirely or partially used for the under-grate firing of the coke ovens, or as a preheating gas in an installation for preheating coal to be used in the coke ovens.

Furthermore, when the cracked gas is subjected to cooling and final purification operations, it may then be employed for the under-grate firing of the coke ovens, for preheating an installation used for preheating coal to be used in the coke ovens, or as a pure gas, mixed gas or carburization agent for other consumer uses.

In accordance with the present invention the catalytic cracking operation as well as the compression and final purification operations are performed at a pressure of from 0 to 30 bar, preferably from 0 to 5 bar.

Further in accordance with the present invention, the catalytic cracking operation is performed at a reaction temperature of from 600° to 1200° C., preferably at a temperature of approximately 900° C.

BRIEF DESCRIPTION OF THE DRAWING

Further objects, features and advantages of the present invention will be apparent from the following detailed description, taken with the accompanying drawing, wherein:

The single FIGURE is a schematic diagram illustrating a preferred embodiment of the process of the present invention.

DETAILED DESCRIPTION OF THE INVENTION

The single drawing FIGURE schematically illustrates one possible arrangement for carrying out the method of the present invention, and particularly a specifically preferred embodiment wherein coke oven gas a comprises gas formed in coke ovens 11 during the coking of preheated coal which is preheated in a preheating installation 10. Such coal preheating is particularly advantageous in accordance with the present invention wherein the coke oven gas a is subjected to a catalytic cracking operation in a catalytic reactor 12 in the presence of a $CO_2$-rich gas as a reaction medium.

Specifically, the coal used for the coking operation is dried in coal preheating installation 10 and preheated therein to a temperature of about 200° C. The heat carrier gas which yields its heat to the coal may be supplied from any suitable source, but in accordance with specific features of the present invention (to be discussed in more detail below) the heat carrier gas o may be a treated coke oven gas or the waste gas from a blast furnace. Due to the fact that by preheating the coal to be used in the coke ovens, the moisture content in the coal is vaporized and expelled, and the coal is also preheated to a temperature of approximately 200° C., the subsequent coking operation may be considerably shortened. By selection of the parameters of the coal preheating operation, it is possible to increase the bulk density of the coal in the coke ovens, thereby improving the quality of the produced coke. The preheating operation also makes it possible to employ coal of varying degrees of quality while achieving high quality coke. Preheating of the coal provides a greater uniformity of the charge of coal introduced into the coke ovens, and this produces a more uniform coking operation and shortens the time required for the coking operation.

It is particularly advantageous to employ the coal preheating installation 10 with the coke ovens 11 when it is desired to transform the coke oven gas a into a reduction gas.

With more particular reference now to the drawing, a hot coke oven gas a obtained from a battery of coke ovens 11 is immediately supplied to a catalytic cracking reactor 12, i.e. without subjecting the coke oven gas to any preliminary cooling operation or any preliminary cleaning operation. The catalytic reactor 12 contains therein a suitable steam reforming catalyst, preferably a substantially $SiO_2$-free, $Al_2O_3$-containing and alkaline earth metal oxide-containing catalyst. Additionally, a hydrogen-containing and/or $CO_2$-containing gas is supplied to catalytic reactor 12. This causes the coke oven gas a to be catalytically cracked to thereby form a hot cracked gas b which is rich in hydrogen and carbon monoxide.

Cracked gas b, in accordance with the present invention, may be employed as a synthesis gas, a fuel gas, or a reduction gas. In the present discussion, and with particular reference to the drawing, reference for the most part will be made to cracked gas b being employed as a reduction gas, and particularly as a reduction gas which may be supplied to a furnace 16 which forms with coke ovens 11 an overall metallurgical installation. It is to be understood that furnace 16 may be any type of reduction furnace, such as a shaft furnace, and particularly a blast furnace into which is injected a reduction gas.

The catalytic cracking operation in reactor 12 occurs at a temperature of from 600 to 1200° C., and preferably at a temperature of approximately 900° C.

In one embodiment of the present invention, the hot cracked gas b may be passed through a heat exchanger 13 wherein the cracked gas is cooled to form cooled cracked gas c. The cooled cracked gas c may be subjected to compression at compression stage 14 to form a compressed cracked gas d. This is particularly advantageous when the cracked gas is to be used in furnace 16 as a reduction gas. The compressed cracked gas d may then be subjected to a final purification operation, particularly desulfurization, in a purification installation 15 to thereby form a purified cracked gas e.

The purified cracked gas e may then be supplied to any desired consumer. Particularly, the purified cracked gas e may be passed in heat exchange relation with the hot cracked gas b to form a reheated cracked gas as a reduction gas f which is then supplied to furnace 16.

Additionally, the hot cracked gas b may be supplied directly to the consumer without first cooling the cracked gas. Particularly, the hot cracked gas may be supplied as a reduction gas r to the furnace 16. In this instance however, it is desirable that the gas be compressed, either before catalytic cracking as at 14a, or after catalytic cracking as at 14b. Furthermore, if it is necessary to subject the cracked gas to a final purification operation, in particular a desulfurization operation, then this may be done as indicated at 15b.

Additionally, in the event that the particular catalyst being employed is rendered ineffective by the sulfur content of the particular coke oven gas involved, then a desulfurization operation may be carried out prior to catalytic cracking, as indicated at 15a.

When the cracked gas is supplied as a reduction gas to a furnace 16 used for the reduction of ore, for example iron ore, then furnace 16 will discharge a waste gas h which is rich in $CO_2$. This waste gas h may be employed as a reaction medium v to supply $CO_2$-containing gas to catalytic reactor 12 for use in the catalytic cracking of the coke oven gas a. Waste gas h may also be used wholly or in part as an under-grate firing gas w for the under-grate firing of catalytic reactor 12. Even further, waste gas h may be used in part as a gas j for the under-grate firing of coke ovens 11, in part as a gas o for the under-grate firing of preheating installation 10, or in part as an excess gas k for other fuel or heating purposes.

Additionally in accordance with the present invention, a portion t' of the purified cracked gas e may be used for the under-grate firing of reactor 12. Also, a portion t" of purified cracked gas e may be used for the under-grate firing of coke ovens 11 or for coal preheating installation 10.

Hot cracked gas b may be cooled in heat exchanger 13 by means of a separate cooling medium m-n. As indicated above, the cooling of hot cracked gas b may also at least partially be achieved by preheating cooled and purified cracked gas e, thereby forming preheated gas f.

Additionally in accordance with the present invention however, a fuel gas g, for example required for the coking operation or for other fuel needs in the overall metallurgical installation, may be heated by passage through heat exchanger 13 in heat exchange relation with hot cracked gas b, thereby at least partially cooling hot cracked gas b.

Even further, hot cracked gas b may be at least partially cooled by passing feed water 1 through heat exchanger 13 in heat exchange relation with hot cracked gas b. This heat exchange will transform water 1 into steam, and when steam is employed as a reaction medium in catalytic reactor 12, at least a portion p of this steam may be fed to catalytic reactor 12. In the event that steam is not used as a reaction medium in catalytic reactor 12, then all of the steam is removed as excess steam s.

In the above specifically described arrangement, when steam is employed as the reaction medium, it is described as being supplied to the catalytic reactor 12 as a portion p of steam formed in heat exchanger 13. Furthermore, when the reaction medium is a $CO_2$-containing gas, it is described as being provided as a portion v from the waste gas of furnace 16. It is specifically to be understood however that in accordance with the present invention steam or other hydrogen-containing gas and/or other $CO_2$-containing gas may be supplied from other external sources, indicated by u in the drawing.

In accordance with a particularly preferred arrangement of the present invention, and when the coke oven gas a comprises gas formed during the coking of preheated coal, the catalytic cracking operation is performed in the presence of $CO_2$-containing gas. This results in the cracked gas being a reduction gas having high reduction capabilities. Specifically, by preheating the coal in preheating installation 10, the water content of the coke oven gas a as it enters the catalytic reactor 12 is reduced, thereby reducing the overall gas throughput by the amount of water removed from the coal during the preheating operation. Accordingly the gas throughput through the catalytic cracking reactor 12 up to and including the cooling operation is reduced, and the corresponding portions of the installation may be made smaller, thereby reducing investment costs. Additionally, the reduced water content in the coal will result in a reduced water content in the coke oven gas a. Therefore, during the catalytic cracking operation the cracking equilibrium will be relatively shifted such that the cracked gas will have greater reducing capabilities. This is particularly advantageous when the hot cracked gas b is led directly as a reduction gas r to the furnace 16, without the intermediate cooling in heat exchanger 13.

The above discussion has been with regard to specifically preferred features and embodiments of the process of the present invention. It is to be understood however that various modifications may be made to the above specifically described features without departing from the scope of the present invention.

What is claimed is:

1. A method for producing a cracked gas suitable for use as a reduction gas, said method comprising:
   introducing coal into a coal preheating installation and therein preheating said coal to a temperature of approximately 200° C.;
   introducing the thus preheated coal into coke ovens and therein producing coke and generating coke oven gas;
   discharging said coke oven gas from said coke ovens; and
   subjecting said coke oven gas, immediately after the discharge thereof from said coke ovens, and without any preliminary cooling operation or any purification operation other than desulfurization, to a catalytic cracking operation at a reaction temperature of from 600° to 1200° C. and at a pressure of from 0 to 30 bar in the presence of steam and/or $CO_2$-containing gas, by passing said coke oven gas into a catalytic reactor containing a steam reforming catalyst, and thereby forming a hot cracked gas rich in hydrogen and carbon monoxide and suitable for use as a reduction gas in a reducing operation.

2. A method as claimed in claim 1, wherein said catalyst comprises a substantially $SiO_2$-free, $Al_2O_3$-and alkaline earth metal oxide-containing catalyst.

3. A method as claimed in claim 2, wherein said catalyst comprises 63% by weight $Al_2O_3$, 31% by weight SrO, and 6% by weight BeO.

4. A method as claimed in claim 2, wherein said catalyst comprises 70% by weight $Al_2O_3$, and 30% by weight BeO.

5. A method as claimed in claim 2, wherein said catalyst comprises 45% by weight $Al_2O_3$, 45% by weight CaO, and 10% by weight SrO.

6. A method as claimed in claim 1, wherein said pressure is from 0 to 5 bar.

7. A method as claimed in claim 1, wherein said reaction temperature is approximately 900° C.

8. A method as claimed in claim 1, wherein said gas comprises steam.

9. A method as claimed in claim 1, wherein said gas comprises a gas rich in $CO_2$.

10. A method as claimed in claim 1, further comprising cooling said hot cracked gas.

11. A method as claimed in claim 10, wherein said cooling comprises passing said hot cracked gas in heat exchange relation with water, thus forming said water into steam, and passing said steam to said catalytic reactor as said gas.

12. A method as claimed in claim 10, further comprising preheating a fuel gas by passing said fuel gas in heat exchange relationship with said hot cracked gas, and then employing the thus preheated fuel gas as a coking gas in said coke ovens.

* * * * *